Figure 1:
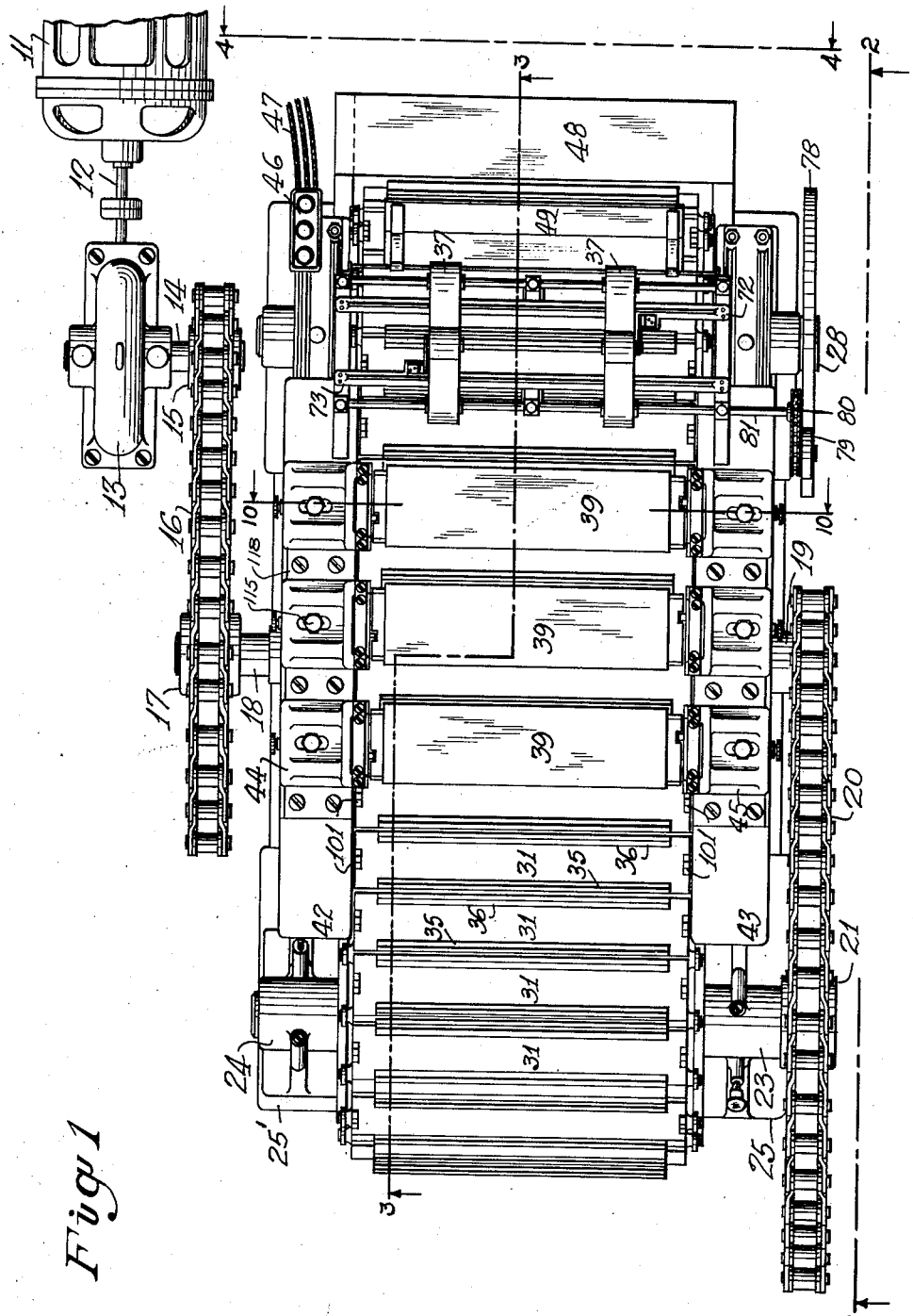

March 21, 1939. A. O. SCHAEFER 2,151,445
MACHINE TOOL
Filed Feb. 4, 1936 6 Sheets-Sheet 4
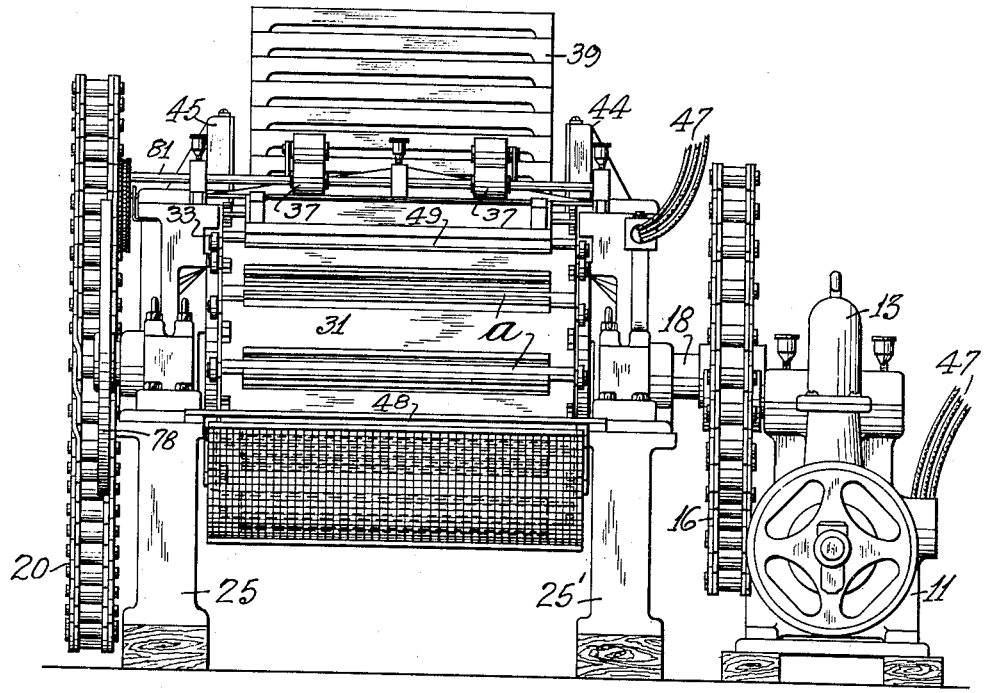
Fig. 4
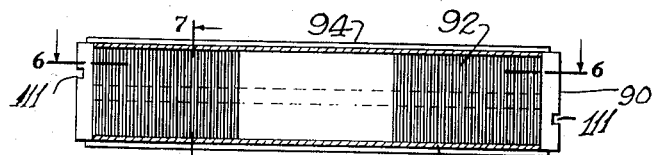 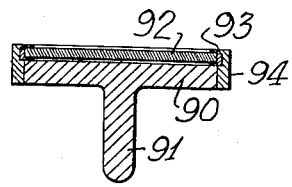
Fig. 5 Fig. 7
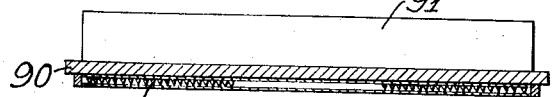 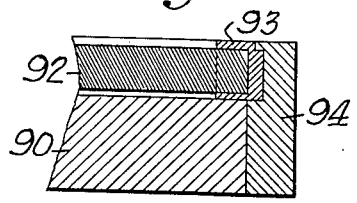
Fig. 6 Fig. 9
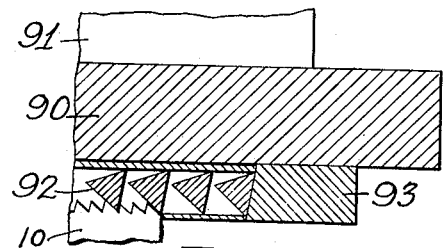
Fig. 8
INVENTOR
Adolph O. Schaefer,
BY
M. H. Loughridge
ATTORNEY March 21, 1939.  A. O. SCHAEFER  2,151,445

MACHINE TOOL

Filed Feb. 4, 1936  6 Sheets-Sheet 5

INVENTOR
Adolph O. Schaefer
BY
Matthew H. Loughridge
ATTORNEY

March 21, 1939.  A. O. SCHAEFER  2,151,445
MACHINE TOOL
Filed Feb. 4, 1936  6 Sheets-Sheet 6

INVENTOR
Adolph O. Schaefer
BY
Matthew H. Loughridge
ATTORNEY

Patented Mar. 21, 1939

2,151,445

UNITED STATES PATENT OFFICE 2,151,445

MACHINE TOOL

Adolph O. Schaefer, Brooklyn, N. Y., assignor to Atlantic Service Company, Inc., Brooklyn, N. Y., a corporation of New York Application February 4, 1936, Serial No. 62,273

38 Claims. (Cl. 76—25)

This invention relates to machine tools of the conveyor belt type in which the conveyor belt forms a vise to hold and carry the work to the tool by the movement of the conveyor and which automatically releases the work at the return movement of the belt. One or more sets of tools may be mounted in the path of movement of the conveyor to operate upon the work; these tools may be moved relative to the work, but are rigidly held relative to the movement of the conveyor belt. The work is placed on the conveyor in register with the tools and it may be levelled or gaged relative to the tools to secure accurate and uniform operation. When the tools are assembled from individual units they are preferably placed in a frame and secured by a matrix under the guidance of a master form and this form may be shaped to give any characteristic desired to the finished product.

The invention as illustrated and described is applied to the multiple filing of saw blades, such as are used for sawing meat in which the files operate at right angles to the blade, and the teeth are spaced with a high degree of accuracy. The machine comprises a pair of opposed and spaced frame members provided with a drum or gear at each end upon which an endless conveyor belt is mounted and is moved by the rotation of one of the drums. The width of the belt is sufficient to take the longest saw blade. The belt is composed of a series of transverse links which are pivotally connected to each other in chain fashion at each end, thereby providing a support for the belt on both of its edges.

Each link is connected to the adjoining link by a common pivot, or by pivots having a common axis and the links project above the pivot point. By this pivotal connection, the abutting edges of the links are arranged to close in towards each other as the belt straightens, and to open out as the belt moves on a curve, as, for instance, on the drums at the ends. This automatically provides a vise or clamping action for the work to carry the work to the tool on the straight portion of the belt and to release the work at the end of the conveyor.

A spring supported bar is provided in the clamping jaw between each pair of links to engage and carry the work, which is placed on this bar at the curved portion of the entering end of the conveyor. As the jaw closes by straightening the belt, this bar is clamped tightly in position by a spring-controlled or yieldable jaw on one of the links which rigidly holds the work to the tool. Before the supporting bar is clamped in position, the exposed edge of the blade passes under a levelling mechanism which depresses this bar against its spring support until it is in a predetermined position, so that the work or the blades are carried forward to the tools in a predetermined position relative to the tool. A notch, or engaging part of the blade registers with a projection on the bar which insures that each blade is properly located transversely on the conveyor to register with the tool.

The levelling mechanism comprises a pair of spaced endless belts which are driven by friction from the mechanism operating the conveyor and so arranged that the surface speed of the belt is slightly in excess of the surface speed of the conveyor to prevent the blade from being tilted backwards during the levelling operation. The belt is backed by a rigid plate supported by the frame and it is made of a fabric that does not injure the teeth of the blade, as the blade is depressed to position.

The tools or files are mounted in a frame above the conveyor belt and several frames may be used with the tools in staggered relation in each frame, or the frame may be arranged to carry tools for different purposes. In filing saw blades ordinary commercial files are used of the triangular form. These files are not made with such accuracy that they can be mounted in rows or banks in the frame by any of the common detachable mountings; therefore, it has been found necessary to position these files by a plastic medium in which the files are located with reference to their filing edge by a master form. For this purpose the files are assembled in the master form, then the frame is applied to this form and the files are secured in position by pouring matrix metal around the ends of the files while they are held by the form. When the matrix has set the form is removed and the frame is mounted on the machine and is weighted according to the pressure desired on the files.

The matrix metal leaves a margin on the file frame that projects below the plane of the files and in order that this projection may not interfere with the movement of the blades by the conveyor and also in order that all the files may engage the blade at the same time, a cam is provided on each link of the conveyor that raises the file frame as the blade enters the plane of the frame and another cam in a similar way raises the frame as the blade passes out from under the frame. The frame is mounted for vertical movement, or movement at right angles to the conveyor belt, but is rigid with relation to the belt movement.

Figure 2:
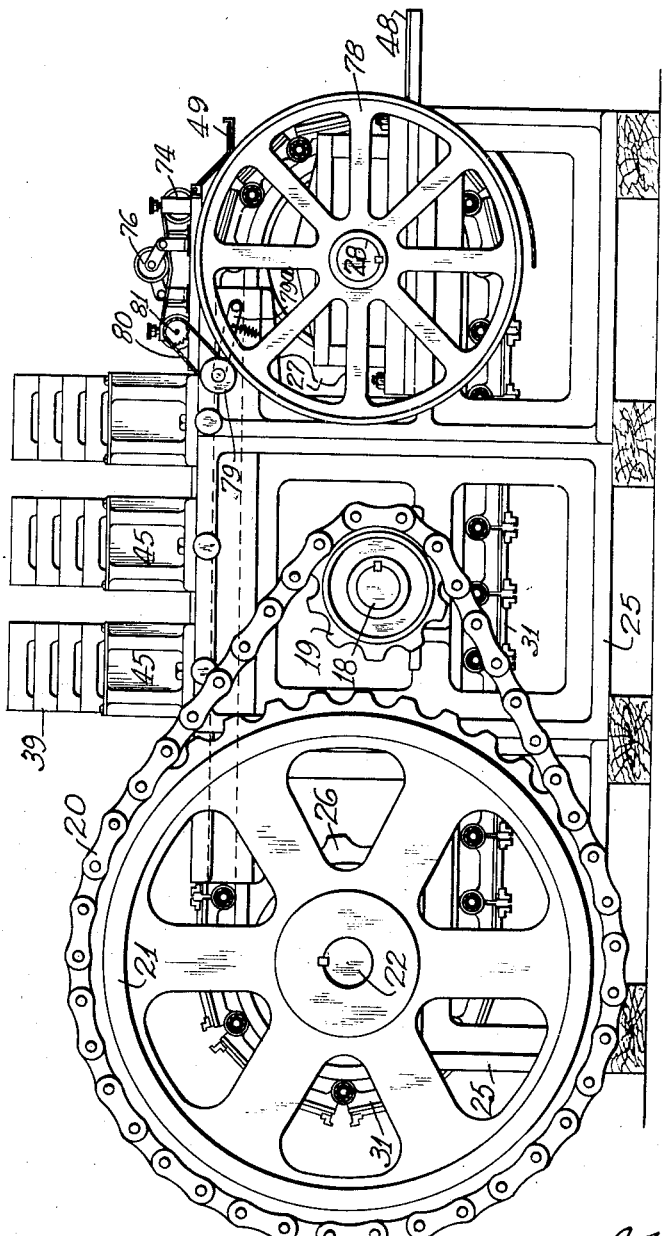
Figure 3:
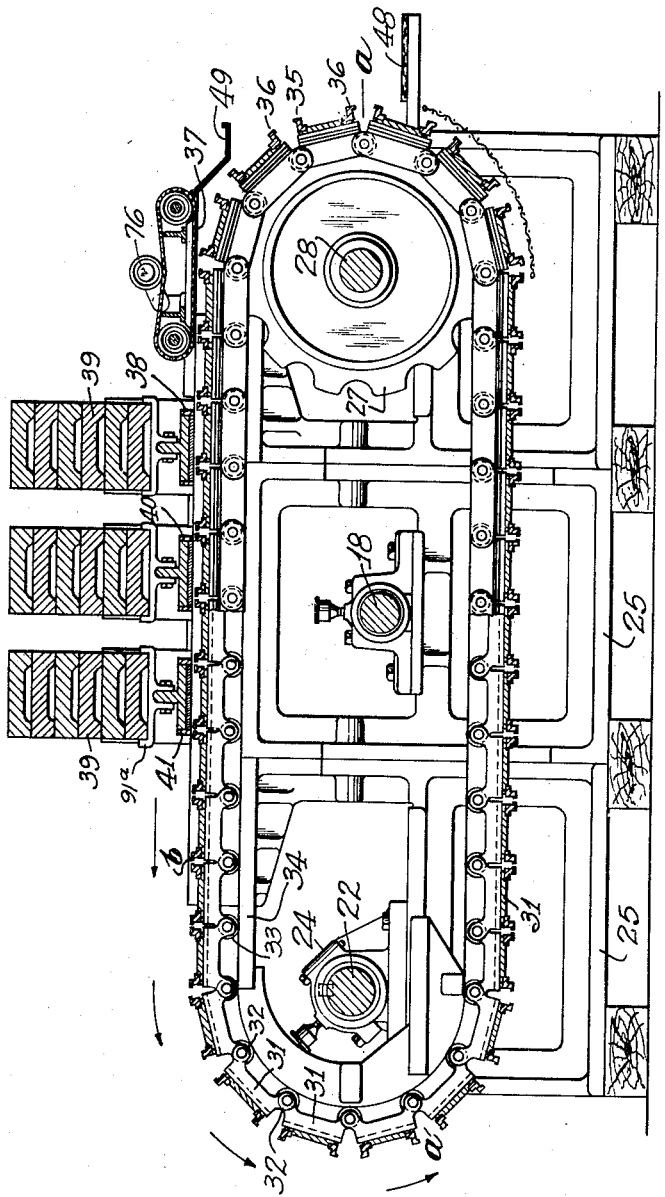
Figure 10:
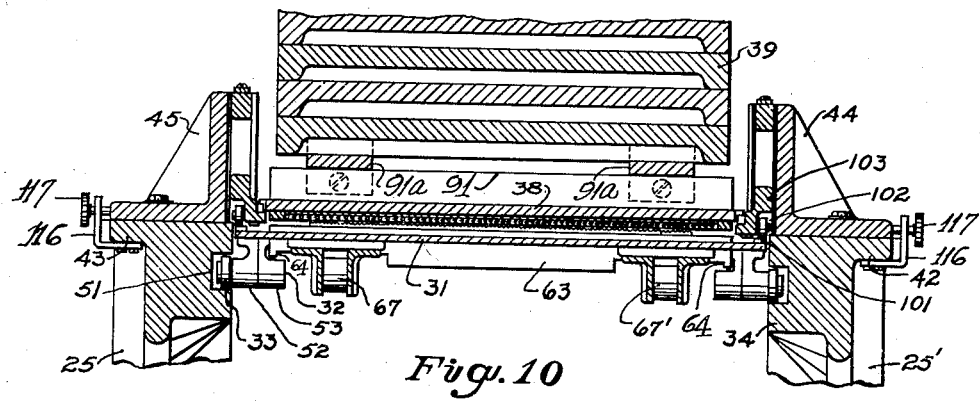
Figure 11:
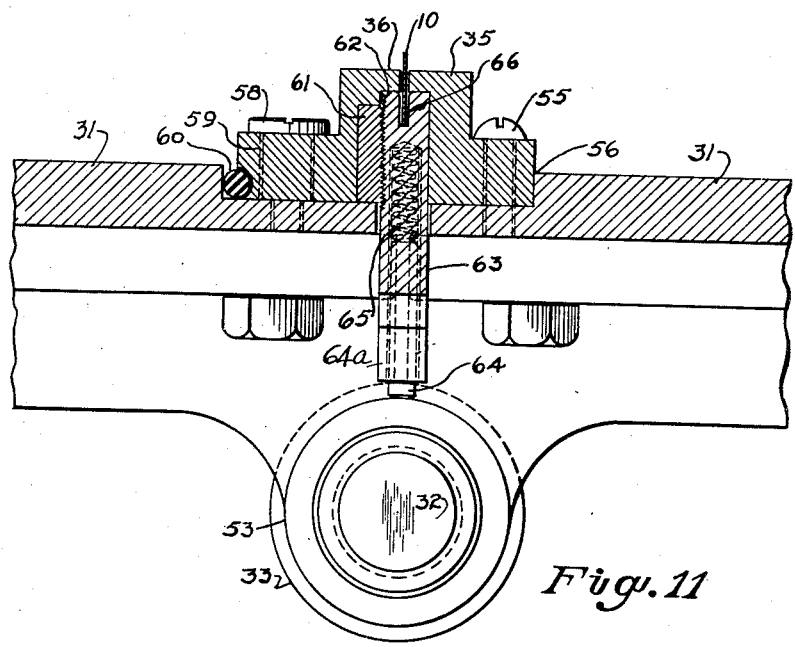
Figure 12:
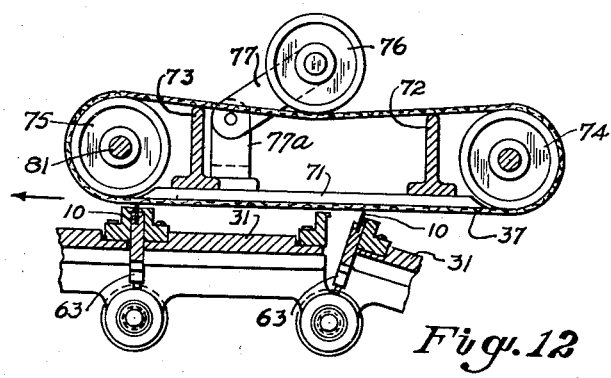
Figure 13:
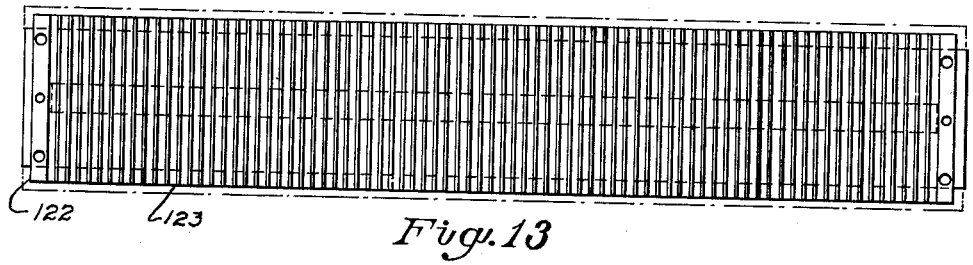
Figure 14:
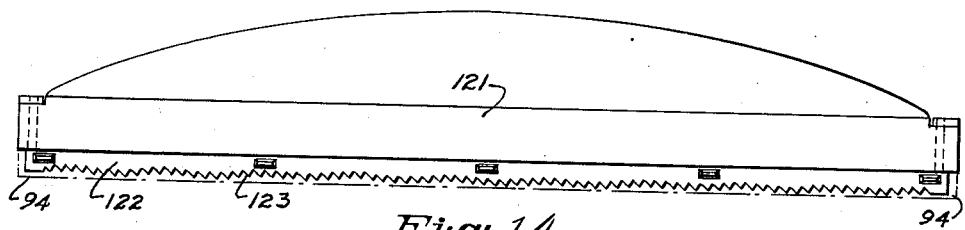
Figure 15:
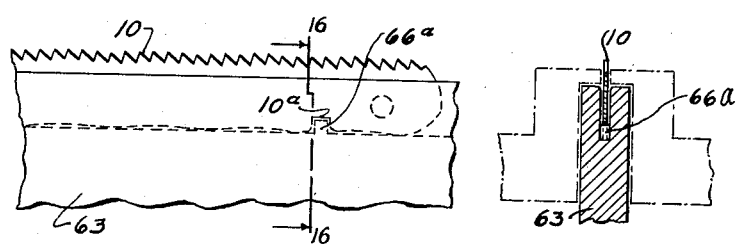
Figure 16:
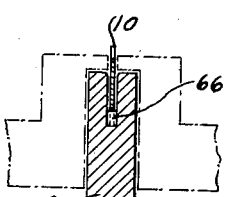
Figure 18:
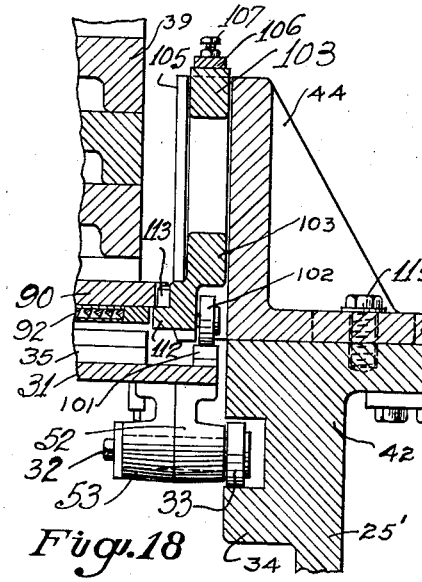
Figure 17:
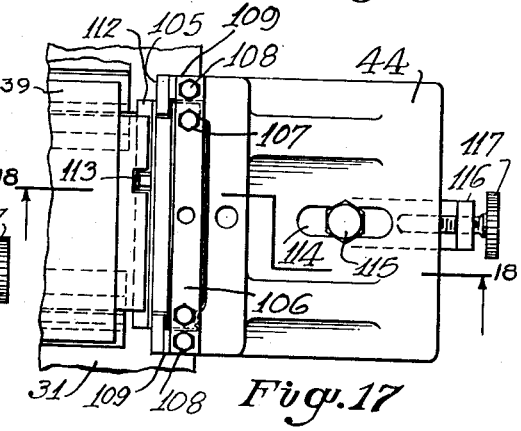

These and other objects of the invention and the manner in which they are carried out will be more particularly understood from the following specification and the accompanying drawings, in which Fig. 1 is a plan view of the machine complete;
Fig. 2 is a side elevation on line 2—2 of Fig. 1;
Fig. 3 is a vertical cross-section on line 3—3 of Fig. 1;

Fig. 4 is an end elevation on line 4—4 of Fig. 1;
Fig. 5 is a plan view of the file frame;
Fig. 6 is a side elevation of line 6—6 of Fig. 5;
Fig. 7 is a cross-section on line 7—7 of Fig. 5;
Fig. 8 is an enlarged sectional detail of Fig. 6;
Fig. 9 is an enlarged sectional detail of Fig. 7;
Fig. 10 is a sectional elevation on line 10—10 of Fig. 1;
Fig. 11 is a side elevation, partly sectioned, through a pair of links of the conveyor;
Fig. 12 is a sectional elevation of the levelling mechanism;
Fig. 13 is a plan view of the front of the master form for the files;
Fig. 14 is a side elevation corresponding to Fig. 13;
Fig. 15 is a detail of the saw blade and registering support;
Fig. 16 is a cross-section on line 16—16 of Fig. 15;
Fig. 17 is an enlarged plan view of the cross-head for the file frame, and
Fig. 18 is a sectional detail on line 18—18 of Fig. 17.

In U. S. Patents 1,841,455 of January 19, 1932, and 1,850,478, of March 22, 1932, I have disclosed a method of filing saw blades in which only one tooth is filed at a time. The present machine may be used to file the teeth in saw blades from blank stock by passing the blades several times through the machine; however, it is more economical to generate the teeth by a punch press, operating by a step motion for each tooth. In a machine of this kind in which the blade is fed forward one tooth at a time, the tolerance, or irregularity, in the feed becomes accumulative, with the result that while the teeth spacing for a short portion of the blade is reasonably accurate, the teeth spacing throughout the blade may be subject to considerable variation. The present invention avoids an accumulated error of this kind and enables all the teeth of the blade to be spaced with extreme accuracy. This is obtained by filing all the teeth at one operation and eliminating the individual feed for each tooth to be filed. The saw blades require frequent filing and are returned to the shop for this purpose and in order that these blades may be refiled in the machine it is necessary that accurate tooth spacing may be maintained. The teeth are also formed to a wave contour as described in the above patents and the files must be located to follow this contour at the time of the filing operation.

In the drawings, 11 is the electric motor which, through shaft 12 and reduction gear 13 drives shaft 14 and the sprocket 15 upon which the chain 16 is mounted and this chain, through the sprocket 17, drives the counter-shaft 18 at a reduced speed. This shaft, through the sprocket 19 and chain 20 drives the sprocket 21 with the shaft 22 at a reduced speed. The shaft 22 is mounted in bearing 23 on one side of the main frame 25 and in bearing 24 on the opposite side of the main frame 25'.

The driving drum of the endless belt conveyor is mounted on shaft 22 and comprises a pair of sprockets 26, spaced to engage the rollers 67, 67', Fig. 10, on the underside of each link of the belt. A complementary drum comprising a pair of sprockets 27 is mounted on shaft 28 which rotates on suitable bearings on the main frame. The conveyor comprises the endless belt, Fig. 3, made from the links 31, which are pivotally connected at 32 and are provided with a roller 33 which rides on the ledge 34 formed in the main frame by the groove 51, Fig. 10. A corresponding connection is provided at each end of the links with rollers supporting each end and thus maintaining the conveyor horizontal and in alignment by supporting it on both edges as it carries the work forward for the operation.

The longitudinal edges of the links are provided with a pair of opposed jaws 35, 36, which, when the belt is on the drums at the end, stand open as indicated at a, but when the belt assumes the straight position as indicated at b the jaws 35, 36, are closed. These jaws clamp and carry forward the saw blades as more particularly described hereafter. The blades pass under the levelling belt 37 before they are secured by the clamp and move forward to pass under the file frames 38, 40 and 41, which frames are weighted by the removable weights 39. These frames are vertically slidable in the heads 44 and 45, which are mounted on the top members 42 and 43 of the main frame, as hereafter referred to. A controller is provided at 46 for the electrical conductors 47, leading to the motor. A safety switch is operated by the displacement of the safety guard 49 for the protection of the operator and which is not detailed in the drawings as this is usual construction in machine tools. A table is provided at 48 for the stock which is placed, one blade between each pair of links by the operator as the conveyor moves.

The details of the links and the clamping action will be understood from Figs. 10 and 11. The lugs 52 and 53 each from adjoining links overlap each other and are pivoted at 32, which pivot carries the roller 33 in the groove 51 of the main frame. A pair of spaced rollers are provided at each end of each link so that the links are rigidly supported on the ledge 34 in the straight movement of the belt. The jaw member 35 is secured by screw 55 in the recess 56 of the link 31 and the jaw member 36 is secured by screw 58 through a slotted opening at 59 to the adjoining link 31. A rubber cushion 60 is provided between the jaw 36 and the link 31 which forces this jaw closed through the lost motion in the slot of screw 58. This compensates for any irregularities in the movement of the jaws in closing and does not permit binding to occur such as would interfere with the proper alignment of the conveyor.

The supporting bar 63 between the jaw members 35 and 36 is provided with a longitudinal slot at 66 for receiving the saw blade 10. A notch or other engagement is provided in the blade at 10a, Fig. 15, which engages a projection 66a in the slot so as to align the blade transversely as it enters the machine. The bar 63 rests upon a pin 64, in guide 64a, Fig. 11, which rests upon the boss 53 of the pivot 32 and engages the coil spring 65 to normally project the bar and the blade upwards, but which can be depressed until the clamp tightens on 63. The member 36 is provided with a serrated jaw 61 which engages a matched serrated surface at 62 on bar 63 to prevent the bar 63 from sliding downwards when the pressure is applied to it in operation.

The levelling device, Fig. 12, comprises the fibre belt 37, mounted to move on the rollers 74 and 75 and which is held taut by the weight roller 76, supported by the arm 77, pivoted to the stand 77a. The lower side of the belt is supported by the plate 71, secured to the frame members 72 and 73, which limits the upward movement of the belt. The shaft 28, Figs. 1 and 2, is provided with a friction wheel 79, and is connected by the drive 80 with the sprocket mounted on shaft 81, which shaft carries the roller 75 and drives the belt 37. The wheel 78 is somewhat larger in diameter than the pitch circle of the drum or sprocket 27 upon which the conveyor is mounted, so that the surface speed of belt 37 is greater than the surface speed of the conveyor and is in the same direction as indicated by the arrow. Wheel 79 is held in engagement with wheel 78 by arm and spring 79a. A pair of levelling belts, operated by shaft 81, are provided as indicated in Fig. 1.

As the belt, Fig. 12, engages the top of the blade 10, it tilts the blade forward with the bar 63 into the vertical position before the jaw closes owing to the higher speed of the belt. This depresses the bar 63 against spring 65 before the clamp becomes effective, so that as bar 63 is secured by the jaws, the top of the saw blade is located at a predetermined height above the conveyor and at a predetermined height with relation to the files, Fig. 10. This is repeated for each blade entering the machine.

The file frame, Figs. 5 to 9, comprises a plate 90 reinforced by the rib 91 and provided with side plates 94 between which the saw files 92 are located and are secured in position by the matrix metal 93 poured into place after the files have been located. The file frame is held to the work by the adjustable weights 39, which are placed on the saddles 91a, and it rests on the rollers 102, Fig. 18. These rollers ride on the end of the conveyor links so that the frame is supported by the conveyor which, in turn, is supported by the rollers 33 in the groove 51 of the frame.

The links are provided with cams 101 at each side which engage the rollers 102 to lift the slide 103 with the frame 90, which occurs at predetermined intervals in the operation of the machine. It will be noted from the enlarged view in Fig. 9, that the matrix metal at 93 projects below the plane of the files, it is therefore necessary to lift the file frame as the blade passes this portion just before the filing begins and also to lift the frame after the filing is completed. The cams 101 are located on the links in position to secure these results. Another advantage in raising the files before they are brought into operation is that they are released to engage the blade vertically and they all engage at the same time.

It will be noted from Fig. 8 and Fig. 15 that the teeth of the blade 10 are much closer than the files 92 can be located. In practice, the files are spaced to file every third tooth which permits filing to a sharp point. For this reason three frames of files are provided as indicated at 39, in Figs. 1 and 2, with the files so staggered with relation to each other that all the teeth are filed as the blade passes along with the conveyor.

The file frames are removably mounted in the crossheads 44, 45, Figs. 10 and 18. These heads are secured to the frame 42 by the bolt 115 in the slotted opening 114 and are transversely positioned by the micrometer screw 117, in the bracket 116, secured to the frame. These adjusting screws are provided on each side of the frame to oppose each other. The heads are held in alignment by the spacing plates 118, Fig. 1, between each pair of heads.

The file frame 90 is placed with its projecting ends resting upon the ledge 112, Fig. 18, of the vertical slide 103, which moves in a groove in the head 44 and is held in place by the cleats 105. A top plate 106 is secured to the slide 103 by the screws 107, the projecting ends of this plate are provided with studs 108 which engage the top of the jaw 109 in head 44, forming the guides for the slide 103. These studs 108 limit the lower position of frame 90 and the files.

The ends of frame 90, Fig. 5, are notched at 111, which notch registers with the projection 113, Figs. 17 and 18, on ledge 112, whereby the frame is secured against movement in the same direction as the conveyor belt and is held in position to register with the teeth of the saw blade when the blade is located by notch 10a in the supporting bar 63.

The placing and aligning of the files in the frames requires the utmost accuracy and it requires that the files remain rigidly in place during the filing operation, further, the established practice is to file the saw teeth in a wave formation. For this purpose a master form 121 is provided as in Figs. 13 and 14, in which grooves have been accurately machined transversely and with the required wave formation as indicated at 123, to form a seat for the filing edge of the files. The file frame 94, Fig. 14, is placed around the projecting face 122 of this form, with the files in place, and the matrix metal is poured into the frame as at 93, Fig. 9, to secure the ends of the files rigidly as the metal sets. The edge of the file towards the face of the form is the filing edge so that by placing the files in the frame by this plastic medium, the files are accurately positioned in the frame and remain in this position until it is necessary to remove them by melting the matrix metal, when another filing edge may be brought to the front, or new files substituted.

The capacity of this machine is limited only by the ability of the operator to feed blades to it. It takes up comparatively little space and it files saws with unusual accuracy.

This machine provides for filing saw blades by moving the blade against stationary files and it will perform this function by any mechanism that will move the blades for this purpose as well as by the conveyor belt shown. The files may be moved during the filing operation to vary the character of the filing.

The machine may be increased in length by adding sections to the frame and additional files or tools may be arranged to engage the blades progressively as they are carried forward by the conveyor. Where the filing is to be repeated on the same blades the blades may be locked in the holders to be retained on the conveyor for the number of operations desired.

While the invention has been described as applied to filing saws it is apparent that it may be used in whole or in part for other purposes as a machine tool within the scope of my invention.

Having thus described my invention, I claim:

1. A machine for filing saw blades and the like comprising a conveyor belt made of links with means between each pair of adjacent links for holding a saw blade in a predetermined position and a bank of files rigidly supported with reference to the movement of said belt and located in register with the teeth of the saw blade and in a plane to engage the blade by the movement of the conveyor.

2. A machine for filing saw blades comprising a main frame with a conveyor belt made of transverse links, with means between each pair of links for holding a saw blade in a predetermined position, a file supporting frame with a bank of files supported by said main frame in position to engage the saw blade as it is moved forward by the conveyor, a guide for said file frame holding it rigid in the direction of movement of the saw blade but free to move in a direction at right angles to the movement of the saw blade.

3. A machine for filing saw blades comprising a main frame with a conveyor belt made of transverse links, with means between each pair of links for holding a saw blade in a predetermined position, a file supporting frame with a bank of files supported by said main frame in position to engage the saw blade as it is moved forward by the conveyor, and a cam on each link of said conveyor for moving said frame as the files engage the blade.

4. A machine for filing saw blades comprising a main frame with a conveyor belt made of links, with means between each pair of links for holding a saw blade in a predetermined position, a plurality of file supporting frames with a bank of files in each frame supported by said main frame with the files positioned to engage each saw blade as it is moved forward by the conveyor, said files being located to register with the teeth of the saw blade.

5. A machine for working on saw blades and the like comprising a main frame with an endless conveyor belt made of links, each link being joined to the adjacent link by a common pivot and forming a jaw between the adjacent edges of each pair of links a freely moving bar in said jaw having a groove for holding the saw blade, said jaw closing by the movement of the conveyor as it moves to the straight position to hold said bar rigid and to move the saw blade to be operated upon.

6. A machine for working on saw blades and the like comprising a main frame with an endless conveyor belt made of links, each link being joined to the adjacent link on the same pivotal axis so as to form a jaw between the adjacent edges of each pair of links, said jaw being open as the conveyor moves on a curve and being closed as the conveyor moves in a straight line and a freely moving bar in said jaw for holding the blade, said bar being clamped in a predetermined position as the conveyor moves from the curved to the straight position and carrying the blade forward to be operated upon.

7. A machine for working on saw blades and the like comprising a main frame with an endless conveyor belt made of links, each link being joined to the adjacent link on the same pivotal axis so as to form a jaw between the adjacent edges of each pair of links, said jaw being open as the conveyor moves on a curve and being closed as the conveyor moves in a straight line, means in said jaw holding the blade, a spring projecting said means, a levelling device depressing the blade against said spring and clamping means securing said holding means as the conveyor assumes the straight position.

8. A machine for working on saw blades and the like comprising a main frame with an endless conveyor belt made of links, each link being joined to the adjacent link on the same pivotal axis members on said links to form a jaw between the adjacent edges of each pair of links, a spring engaging the link and opposing one member of said jaw, said jaw being open as the conveyor moves on a curve and being closed as the conveyor moves in a straight line, a supporting bar freely movable in said jaw holding said blade and said jaw engaging said supporting bar with a yieldable clamp formed by said spring as the conveyor assumes the straight position.

9. A machine for working on saw blades and the like comprising a main frame with an endless conveyor belt made of links, each link being joined to the adjacent link on the same pivotal axis so as to form a jaw between the adjacent edges of each pair of links, said jaw being open as the conveyor moves on a curve and being closed as the conveyor moves in a straight line, a supporting bar in said jaw having a groove for said blade, means for locating said blade in a predetermined position in said groove and said jaw clamping said supporting bar as the conveyor assumes the straight position.

10. A machine for working on saw blades and the like comprising a main frame with an endless conveyor belt made of links, each link being pivotally joined to the adjacent link on the same pivotal axis so as to form a jaw between the edges of adjacent links, a yieldable supporting bar in said jaw for the lower edge of the saw blade and a levelling device engaging the exposed edge of said blade to locate it in a predetermined position with reference to said main frame as the jaw engages said support.

11. A machine for working on saw blades and the like comprising a main frame with an endless conveyor belt made of links, each link being pivotally joined to the adjacent link on the same pivotal axis so as to form a jaw between the edges of adjacent links, a yieldable supporting bar in said jaw and clamped in said jaw as the conveyor assumes the straight position, supporting the lower edge of the saw blade and a levelling device engaging the exposed edge of the blade and moving with the blade to locate it in a predetermined position as the jaw clamps the supporting bar.

12. A machine for working on saw blades and the like comprising a main frame with an endless conveyor belt made of links, each link being pivotally joined to the adjacent link on the same pivotal axis so as to form a jaw between the edges of adjacent links, a yieldable supporting bar in said jaw and clamped in said jaw as the conveyor assumes the straight position, supporting the lower edge of the saw blade and a belt engaging the exposed edge of the blade and moving slightly faster than the blade to locate the blade in a predetermined position as the jaw clamps the supporting bar.

13. A machine for working on saw blades and the like comprising a main frame with an operating tool and with an endless conveyor belt made of links, each link being joined to the adjacent link by the same pivotal axis so as to form a jaw between the edges of adjacent links, means for clamping a blade in each jaw as the links straighten out, means for driving said conveyor belt to move the blade to engage the operating tool, an endless belt engaging the exposed edge of the blade and means for driving said endless belt by the conveyor driving means.

14. A machine for working on saw blades and the like comprising a main frame with an endless conveyor belt made of links, each link being joined to the adjacent link on the same pivotal axis, so as to form a jaw between the edges of adjacent links, a yieldable supporting bar in said jaw for supporting the saw blade and serrated engaging surfaces on said jaw and said bar to hold the bar rigid as the conveyor belt straightens.

15. In combination, an endless conveyor belt made of transverse links pivotally connected to each other and forming a jaw between the adjacent edges of each pair of links, means for clamping the work in said jaw as the conveyor straightens out and for releasing the work as the conveyor moves on a curve, means for levelling the work as it is clamped by the conveyor and a tool for operating on the work located in the path of movement of the work.

16. In combination, an endless conveyor belt made of transverse links pivotally connected to each other and forming a jaw between the adjacent edges of each pair of links, means for clamping the work in said jaw as the conveyor straightens out and for releasing the work as the conveyor moves on a curve, means for levelling the work as it is clamped by the conveyor, a tool for operating on the work as it is moved by the conveyor and means operated by the conveyor for moving the tool at right angles to the work.

17. A machine for filing saw blades comprising a main frame with a conveyor made of transverse links, and forming a jaw between the adjacent edges of each pair of links, means for clamping the saw blade in said jaw, a file frame supported by said main frame and a bank of files secured to said file frame by a matrix with the files in register with the teeth of the saw blade and arranged to engage the saw blade as it is moved by the conveyor.

18. A machine for filing saw blades comprising a main frame with a conveyor made of transverse links, and forming a jaw between the adjacent edges of each pair of links, means for clamping the saw blade in said jaw, a file frame supported by the main frame and a bank of files secured to the file frame by a matrix, and a master form for locating said files in the matrix with reference to the filing edge of the file, said files arranged to engage the saw blade as it is moved by the conveyor.

19. A machine for filing saw blades comprising a main frame with a conveyor made of transverse links, and forming a jaw between the adjacent edges of each pair of links, means for clamping the saw blade in said jaw, a file frame supported by the main frame and a bank of files secured to the file frame by a matrix, and a master form for locating said files in the matrix in a wave formation, means for registering the teeth of the saw blade with the files, said files being arranged to engage the saw blade as it is moved by the conveyor.

20. A machine tool comprising a frame with a groove therein, a conveyor belt made of transverse links passing around a pair of drums and having a straight portion between the drums, pivotal means connecting each adjacent pair of links, a roller mounted on said pivotal means and arranged to move in said groove as the conveyor belt moves, means for clamping and holding the work between each pair of links as the belt straightens, a tool frame transverse to the belt having a tool located to engage the work on the straight part of the belt as the conveyor moves and means for moving said tool frame by said conveyor.

21. A machine tool comprising a frame with a vertical slide and a groove in said frame, a conveyor belt made of transverse links passing around a pair of drums and having a straight portion between the drums, pivotal means connecting each adjacent pair of links, a roller mounted on said pivotal means and arranged to move in said groove as the belt moves, means for clamping and holding the work between each pair of links as the belt straightens and a tool frame with a tool engaging the work, said tool frame moving in said vertical slide and resting by gravity upon the straight part of the belt.

22. A machine tool comprising a frame with a groove therein, a conveyor belt made of transverse links, pivotal means connecting each adjacent pair of links, a roller mounted on said pivotal means and arranged to move in said groove as the belt moves, means for clamping and holding the work between each pair of links as the belt straightens, a frame with a tool engaging the work, a mounting for said frame permitting a free movement of the frame at right angles to the belt and preventing a movement in the direction of the movement of the belt and a cam on the links of the belt engaging said frame to move it at right angles relative to the belt.

23. A machine tool comprising a frame with a pair of parallel grooves therein, a guide on said frame at right angles to said grooves, a conveyor belt made of transverse links, pivotal means connecting each adjacent pair of links at the ends, a member extending from each of said pivotal means to ride in said grooves, whereby the links are held horizontal, means for clamping and holding the work between each pair of links and a frame slidably mounted in said guide with a tool engaging the work resting upon said links as the conveyor moves.

24. A machine tool comprising a conveyor belt made of links, pivotal means connecting each pair of adjacent links, a member on the edge of each link one of which has a pin-slot attachment to the link and each pair of said members forming a jaw to clamp the work, a spring engaging the member with the pin slot attachment to form a yielding jaw and a tool engaging the work as it is moved by said conveyor.

25. A machine tool comprising an endless conveyor belt made of links, pivotal means connecting each pair of adjacent links, a member on the edge of each link one of which has a pin-slot attachment to the link and each pair of said members forming a jaw to clamp the work as the conveyor assumes the straight position, a rubber cushion arranged to engage the member with the pin-slot attachment and take the thrust of the jaw and means for operating on the work as it is moved by said conveyor.

26. A machine tool comprising a conveyor belt made of links and moving in a straight line between a pair of drums, pivotal means connecting each pair of adjacent links, a member on the edge of each link and each pair of said members forming clamping jaws, said jaws having a slot therebetween, a supporting bar in said slot supporting the work, a spring supporting said bar when the jaw is released, said bar being rigidly clamped when the conveyor assumes the straight position and means for operating on the work as it is moved by the conveyor.

27. A machine tool comprising an endless conveyor belt made of links, pivotal means connecting each pair of adjacent links, a member on the edge of each link and each pair of said members forming clamping jaws, said jaws having a slot therebetween, a supporting bar in said slot supporting the work, a stud engaging said pivotal means, a spring engaging said stud and supporting said bar when the jaw is open, said bar being rigidly clamped when the conveyor assumes the straight position and means for operating on the work as it is moved by the conveyor.

28. A machine tool comprising an endless conveyor belt made of links, pivotal means connecting each pair of adjacent links, the opposing edges of each pair of links being arranged to form clamping jaws, said jaws having a slot therebetween, a supporting bar in said slot for supporting the work, said bar being free when the jaw is open and being rigidly clamped when the conveyor assumes the straight position, a spring urging said bar upwards in the slot, means engaging the work before the jaw closes to locate it in a predetermined position and means for operating on the work as it is moved by the conveyor.

29. A machine tool comprising an endless conveyor belt made of links, means for driving said belt, pivotal means connecting each pair of adjacent links, the opposing edges of each pair of links being arranged to form clamping jaws, said jaws having a slot therebetween, a supporting bar in said slot for supporting the work, said bar being free when the jaw is open and being rigidly clamped when the conveyor assumes the straight position, a spring urging said bar upwards in the slot, an endless belt driven by said driving means engaging the work before the jaw closes to locate it in a predetermined position and means for operating on the work as it is moved by the conveyor.

30. A machine tool comprising a conveyor belt made of links, a drum around which said belt moves, means for driving said belt, pivotal means connecting each pair of adjacent links, the opposing edges of each pair of links being arranged to form clamping jaws, said jaws having a slot therebetween, a supporting bar in said slot for supporting the work, said bar being free when the jaw is open and being rigidly clamped when the conveyor assumes the straight position, a spring urging said bar upwards in the slot, an endless belt, a friction wheel mounted to rotate with said drum, friction means engaging said wheel and driving said endless belt, said belt engaging the work before the jaw closes to locate the work in a predetermined position and means for operating on the work as it is moved by the conveyor.

31. A machine tool comprising a conveyor belt made of links and moving in a straight line between a pair of drums, means for driving said belt, pivotal means connecting each pair of adjacent links to form clamping jaws, said jaws having a slot therebetween, a supporting bar in said slot for supporting the work, said bar being free when the jaw is open and being rigidly clamped by said jaw when the conveyor assumes the straight position, a spring urging said bar upwards in the slot, an endless belt driven by said driving means engaging the work before the jaw closes to locate the work in a predetermined position, means supporting said belt opposite where it engages the work and means for operating on the work as it is moved by the conveyor.

32. A machine tool having a frame with a pair of guides thereon comprising a pair of spaced members with parallel grooves therein, a conveyor belt made of transverse links, pivotal means connecting each adjacent pair of links at their ends, a member extending from each of said pivotal means to ride in said grooves, a drum comprising a pair of spaced sprockets about which said belt moves, spaced rollers on said links arranged to engage said sprockets, each pair of said links forming a jaw to clamp and hold the work when said members ride in said grooves and to release the work as the conveyor passes around the drum and a frame with a tool moving in said guides for operating on the work as it is moved by the conveyor.

33. A machine tool comprising a belt conveyor holding and moving the work to be operated upon, a frame movable at right angles to the movement of the work, a tool mounted in said frame to engage the work and means operated by the belt conveyor for moving said frame before and after the work reaches the position to be engaged by the tool.

34. A machine tool comprising a conveyor having spaced work holders for clamping and moving the work to be operated upon, a tool engaging the work, located in the path of movement of the work and a levelling device moving with the conveyor engaging and locating the work in a predetermined position relative to the tool before it is clamped by said work holder.

35. A machine tool comprising a conveyor having spaced work holders for clamping and moving the work to be operated upon, a tool engaging the work, located in the path of movement of the work and an endless belt mounted to move with the work and engaging the work to locate it in a predetermined position relative to the tool before it is clamped by said work holder.

36. A machine for filing saw blades and the like comprising an endless conveyor belt made of links pivotally joined, means for supporting a saw blade between each pair of links comprising a projection engaging a notch in the back of the blade to position the blade transversely of the belt, means for clamping the blades by the links as the conveyor straightens a vertically movable frame with a weight and a plurality of files located in the path of movement of said blades and registering with the teeth of the blades whereby the blades are filed by the movement of the conveyor and the weight acting on the frame.

37. A machine for filing saw blades and the like comprising an endless conveyor belt made of links pivotally joined, means for supporting a saw blade between each pair of links, a file frame with a bank of files located in register with the teeth of the saw blades to engage the blades as they are moved by the conveyor, said files secured to said frame by a matrix at the ends of the files and means operated by the conveyor for moving the ends of the files out of engagement with the saw blades.

38. A machine for filing saw blades and the like comprising an endless conveyor belt made of links pivotally joined, a spring mounted bar located between each pair of links and clamped by the links as the conveyor straightens, a saw blade being mounted on each bar and engaging means between the blade and the bar for positioning the blade transversely of the conveyor, levelling means engaging the blade to position the supporting bar before it is clamped by the links, and a frame with a plurality of files located in the path of movement of the blades and registering with the teeth of the blades whereby the blades are filed by the movement of the conveyor.

ADOLPH O. SCHAEFER.